(12) United States Patent
Kohno et al.

(10) Patent No.: US 10,026,438 B2
(45) Date of Patent: Jul. 17, 2018

(54) INFORMATION PROCESSING APPARATUS FOR REPRODUCING DATA BASED ON POSITION OF CONTENT DATA

(75) Inventors: Michinari Kohno, Tokyo (JP); Fujio Nobori, Kanagawa (JP); Satoshi Miyazaki, Kanagawa (JP); Yoshiki Tanaka, Tokyo (JP); Mitsuhiro Hosoki, Tokyo (JP); Tomohiko Okazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1167 days.

(21) Appl. No.: 12/880,488

(22) Filed: Sep. 13, 2010

(65) Prior Publication Data

US 2011/0080478 A1    Apr. 7, 2011

(30) Foreign Application Priority Data

Oct. 5, 2009 (JP) ................ P2009-231352

(51) Int. Cl.
*H04N 7/18* (2006.01)
*G11B 20/00* (2006.01)
*G06F 3/147* (2006.01)
*G06Q 30/02* (2012.01)
*G06F 3/14* (2006.01)
*G09G 5/12* (2006.01)

(52) U.S. Cl.
CPC .......... *G11B 20/00* (2013.01); *G06F 3/147* (2013.01); *G06Q 30/02* (2013.01); *G06F 3/1446* (2013.01); *G09G 5/12* (2013.01); *G09G 2340/0464* (2013.01); *G09G 2354/00* (2013.01); *G09G 2380/06* (2013.01)

(58) Field of Classification Search
USPC ........................................... 348/143
See application file for complete search history.

(56) References Cited

U.S. PATENT DOCUMENTS 6,269,173 B1 * 7/2001 Hsien ................ 382/103
6,466,183 B1   10/2002 Yamamoto et al.
6,967,674 B1 * 11/2005 Lausch ............. 348/143
(Continued)

FOREIGN PATENT DOCUMENTS

JP        2000-172221         6/2000

OTHER PUBLICATIONS

European Search Report dated Apr. 6, 2011, in Munich in corresponding European patent application No. EP 10 17 6062.

*Primary Examiner* — Joshua Joo
(74) *Attorney, Agent, or Firm* — Chip Law Group

(57) ABSTRACT

There is provided an information processing apparatus including a reproduction section which acquires reproduction data corresponding to a reproduction position of content data by reproducing the content data, an output section which causes the reproduction data acquired by the reproduction section to be output from a region of an output device, the region corresponding to the information processing apparatus, a control signal acquisition section which acquires a control signal generated and output by a control device based on a predetermined input recognized by a recognition device, and an output control section which controls output of the reproduction data to the output device performed by the output section in accordance with the control signal acquired by the control signal acquisition section.

20 Claims, 14 Drawing Sheets

(56) References Cited

U.S. PATENT DOCUMENTS

| | | | | |
|---|---|---|---|---|
| 6,983,393 | B2* | 1/2006 | Truchard | H04L 67/12 702/108 |
| 7,894,854 | B2* | 2/2011 | Lee | G06F 3/1446 455/556.1 |
| 8,340,494 | B2* | 12/2012 | Maeoka | H04N 5/765 386/200 |
| 8,436,786 | B2* | 5/2013 | Kamoto | 345/1.1 |
| 9,003,280 | B2* | 4/2015 | Price | G06Q 30/02 715/254 |
| 9,043,504 | B2* | 5/2015 | Rangarajan | G06F 9/544 709/212 |
| 2002/0032975 | A1 | 3/2002 | Shin | |
| 2002/0046100 | A1* | 4/2002 | Kinjo | G06F 3/011 705/14.66 |
| 2002/0051081 | A1* | 5/2002 | Hori | G11B 27/005 348/553 |
| 2002/0118210 | A1* | 8/2002 | Yuasa | H04N 1/6052 345/589 |
| 2003/0004805 | A1* | 1/2003 | Vaitekunas et al. | 705/14 |
| 2004/0037469 | A1 | 2/2004 | Werner et al. | |
| 2004/0044574 | A1* | 3/2004 | Cochran et al. | 705/14 |
| 2004/0098137 | A1 | 5/2004 | Hollemans | |
| 2004/0252400 | A1* | 12/2004 | Blank | G06F 17/30017 360/70 |
| 2005/0246746 | A1* | 11/2005 | Yui | G08C 17/02 725/80 |
| 2006/0145941 | A1* | 7/2006 | Park | G06F 3/1446 345/1.1 |
| 2007/0078003 | A1* | 4/2007 | Sato | A63F 13/10 463/43 |
| 2007/0226762 | A1* | 9/2007 | Girgis et al. | 725/33 |
| 2008/0030425 | A1* | 2/2008 | Fullerton | G06F 3/1423 345/1.1 |
| 2008/0147488 | A1* | 6/2008 | Tunick | G06Q 30/02 705/7.29 |
| 2008/0172781 | A1* | 7/2008 | Popowich et al. | 4/476 |
| 2008/0177822 | A1* | 7/2008 | Yoneda | H04L 12/282 709/202 |
| 2008/0238889 | A1 | 10/2008 | Thorne | |
| 2009/0164896 | A1* | 6/2009 | Thorn | G06F 1/1626 715/700 |
| 2009/0177528 | A1 | 7/2009 | Wu et al. | |
| 2009/0217315 | A1* | 8/2009 | Malik et al. | 725/9 |
| 2009/0278861 | A1* | 11/2009 | Price | G06Q 30/02 345/668 |
| 2010/0110062 | A1* | 5/2010 | Kennedy | G06F 3/1423 345/213 |
| 2010/0111491 | A1* | 5/2010 | Kamoto | G06F 3/1446 386/207 |
| 2010/0122304 | A1* | 5/2010 | Scott, III | H04N 5/76 725/89 |
| 2011/0007171 | A1* | 1/2011 | Okumura | G06T 1/0085 348/211.4 |
| 2011/0032274 | A1* | 2/2011 | Miyata | G06F 3/011 345/660 |
| 2011/0043514 | A1* | 2/2011 | Hussain | G09G 5/18 345/213 |
| 2011/0205371 | A1* | 8/2011 | Nagata et al. | 348/207.1 |
| 2012/0144435 | A1* | 6/2012 | Spilo | H04N 5/76 725/78 |
| 2017/0237795 | A1* | 8/2017 | Wogsberg | H04L 65/607 709/219 |

* cited by examiner

INFORMATION PROCESSING APPARATUS FOR REPRODUCING DATA BASED ON POSITION OF CONTENT DATA

BACKGROUND OF THE INVENTION

Field of the Invention

The present invention relates to an information processing apparatus, an information processing method, and an information processing system.

Description of the Related Art

In recent years, there have been used various pieces of content such as video, audio, and text. For example, as a technology for displaying video as an example of the content, there is disclosed a technology for storing still image data including multiple programs having different contents from each other, sequentially selecting the programs by the control of control means, and supplying a display device with still image data corresponding to the selected program (for example, see JPA-2000-172221). According to the technology, for example, multiple pieces of still image data having different display contents may be displayed in a manner that the pieces of still image data are switched every time a train passes by. For example, since the passengers of the train can see the multiple pieces of still image data one by one continuously, there can be achieved a similar effect as when they see a moving image.

SUMMARY OF THE INVENTION

However, the technology disclosed in JP-A-2000-172221 is for displaying different pieces of content on respective display devices, and is not for displaying the same content on the respective display devices. Further, the technology disclosed in JP-A-2000-172221 is for displaying pieces of content independently on respective display devices, and is not for controlling the pieces of content displayed on respective display devices.

In light of the foregoing, it is desirable to provide a novel and improved technology which is capable of causing respective regions of an output device to output the same content, and which is capable of controlling the content to be output from the respective regions.

According to an embodiment of the present invention, there is provided an information processing apparatus which includes a reproduction section which acquires reproduction data corresponding to a reproduction position of content data by reproducing the content data, an output section which causes the reproduction data acquired by the reproduction section to be output from a region of an output device, the region corresponding to the information processing apparatus, a control signal acquisition section which acquires a control signal generated and output by a control device based on a predetermined input recognized by a recognition device, and an output control section which controls output of the reproduction data to the output device performed by the output section in accordance with the control signal acquired by the control signal acquisition section.

The information processing apparatus may further include a synchronization signal generation section which generates a synchronization signal for synchronizing the information processing apparatus with another information processing apparatus in terms of the reproduction position of the content data, and a synchronization signal transmission section which transmits the synchronization signal generated by the synchronization signal generation section to the other information processing apparatus.

The reproduction section may further acquire reproduction position information indicating the reproduction position of the content data and reproduction time information indicating a time at which the reproduction position is reproduced. The synchronization signal generation section may generate the synchronization signal which includes the reproduction position information and the reproduction time information acquired by the reproduction section.

The information processing apparatus may further include a synchronization signal reception section which receives a synchronization signal for synchronizing the information processing apparatus with another information processing apparatus in terms of the reproduction position of the content data, and a reproduction position adjustment section which adjusts the reproduction position of the content data based on the synchronization signal received by the synchronization signal reception section.

The reproduction section may further acquire reproduction position information indicating the reproduction position of the content data and reproduction time information indicating a time at which the reproduction position is reproduced. The synchronization signal reception section may receive the synchronization signal which includes reproduction position information indicating the reproduction position of the content data in the other information processing apparatus and reproduction time information indicating a time at which the reproduction position is reproduced in the other information processing apparatus. The reproduction position adjustment section may extract the reproduction position information and the reproduction time information from the synchronization signal received by the synchronization signal reception section, and may adjust the reproduction of the content data performed by the reproduction section, based on the extracted reproduction position information and reproduction time information and based on the reproduction position information and reproduction time information acquired by the reproduction section.

The control signal acquisition section may acquire the control signal including an offset calculated by the control device based on the predetermined input. The output control section may extract the offset from the control signal acquired by the control signal acquisition section, and may generate shifted reproduction data by shifting the reproduction data by a distance equivalent to the extracted offset. The output section may cause the shifted reproduction data generated by the output control section to be output from a region of the output device, the region corresponding to the information processing apparatus.

According to the embodiment of the present invention described above, it is possible to cause the respective regions of the output device to output the same content, and it is also possible to control the content to be output from the respective regions.

DETAILED DESCRIPTION OF THE EMBODIMENTS

Figure 1:
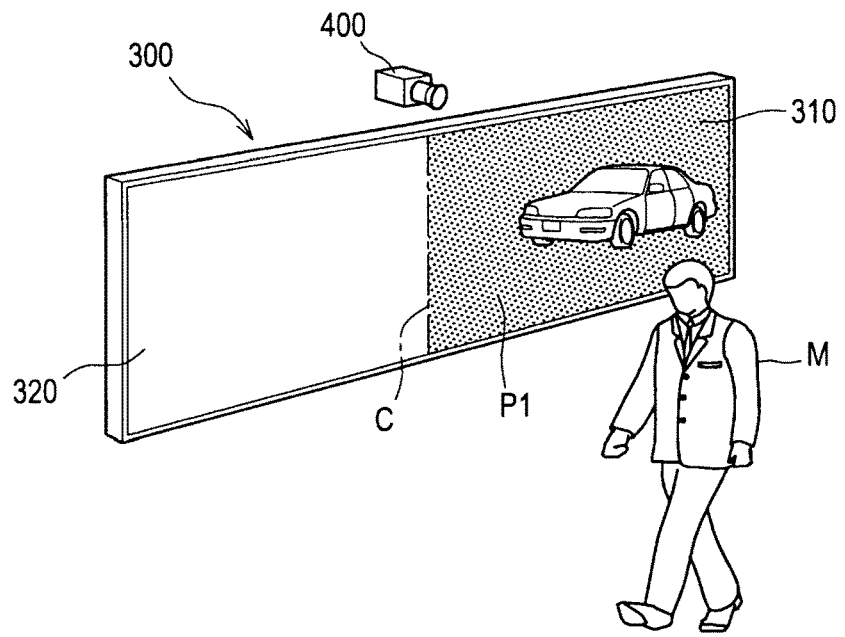
FIG. 1 is a diagram showing an example of content output by an output device according to a first embodiment of the present invention (part 1)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. First embodiment (in case of using one output device)
1-1. Example of content output by output device (part 1)
1-2. Example of content output by output device (part 2)
1-3. Example of content output by output device (part 3)
1-4. Example of content output by output device (example of content output in accordance with detection attribute)
1-5. Example of content output by output device (example of content output in accordance with number of detected people)
1-6. Configuration example of information processing system
1-7. Functional configuration example of first information processing apparatus
1-8. Functional configuration example of second information processing apparatus
1-9. Functional configuration example of control device
1-10. Synchronization processing between first information processing apparatus and second information processing apparatus
1-11. Flow of processing executed by control device
1-12. Flow of processing executed by first information processing apparatus
1-13. Flow of processing executed by second information processing apparatus
2. Second embodiment (in case of using multiple output devices)
2-1. Example of content output by output device (part 1)
2-2. Example of content output by output device (part 2)
2-3. Example of content output by output device (part 3)
2-4. Configuration example of information processing system
3. Modified example
4. Summary

1. FIRST EMBODIMENT (IN CASE OF USING ONE OUTPUT DEVICE)

1-1. Example of Content Output by Output Device (Part 1)

FIG. 1 is a diagram showing an example of content output by an output device according to a first embodiment of the present invention (part 1). With reference to FIG. 1, the example of the content output by the output device according to the first embodiment of the present invention (part 1) will be described.

As shown in FIG. 1, an output device 300 according to the first embodiment of the present invention includes a first region 310 and a second region 320, which are for outputting reproduction data P1 obtained by reproducing content data. As the content data, there can be used video data, audio data, text data, and the like, and the type of the content data is not particularly limited. Note that, in the present embodiment, the output device 300 includes two regions (the first region 310 and the second region 320), and the number of the regions is not particularly limited as long as it is plural. Further, in the present embodiment, although a display device is used as the output device 300, the output device 300 is not limited to the display device and can be changed depending on the type of content data used in the present embodiment. For example, in the case where audio data is used as the content data, a speaker can be used as the output device 300.

In the first embodiment of the present invention, the first region 310 and the second region 320 are divided from each other with a center line C as a border line, and the first region 310 and the second region 320 have the same shape and the same size as each other. However, the first region 310 and the second region 320 may have different shapes from each other, and may have different sizes from each other. In the case where the size of the first region 310 and the size of the second region 320 differ from each other, an object displayed in the first region 310 and an object displayed in the second region 320 can be enlarged or reduced in such a manner that the objects are displayed in the same size.

Further, as shown in FIG. 1, a recognition device 400 is provided at a predetermined position. Note that a camera is used as the recognition device 400 in the present embodiment, the position of the face of a person M is detected from an image acquired by the camera, and whether the person M is in front of the first region 310 or in front of the second region 320 is detected in accordance with the detected face position. Further, in the case where the person M is detected to be in front of the first region 310, the reproduction data P1 is output from the first region 310 as shown in FIG. 1. In this way, it becomes possible to output the reproduction data P1 from the position close to the person M.

In the example shown in FIG. 1, although the size of the reproduction data P1 is the same as the size of the first region 310 and the size of the second region 320, the size of the reproduction data P1 may be smaller or larger than the size of the first region 310 and the size of the second region 320. The recognition device 400 may be any as long as it can at least detect a predetermined trigger for selecting which of the first region 310 and the second region 320 the reproduction data P1 is to be output from, and is not particularly limited. For example, in order to recognize the detection of the person M as a trigger, an infrared sensor can also be used as the recognition device 400.

Further, although the number of the recognition device 400 is one in the present embodiment, the number thereof may be two or more. For example, in the case where the person M has an RFID (Radio Frequency IDentification) tag, in order to recognize the detection of the person M as a trigger, a first reader which responds to the first region 310 may be provided (e.g., in the vicinity of the first region 310) as the recognition device 400, and a second reader which responds to second region 320 may be provided (e.g., in the vicinity of the second region 320) as the recognition device 400. In that case, when the first reader reads the RFID tag, reproduction data P1 is output from the first region 310, and when the second reader reads the RFID tag, the reproduction data P1 is output from the second region 320.

Further, the recognition device 400 may recognize operation performed by the person M as a trigger. For example, a first button which responds to the first region 310 may be provided (e.g., in the vicinity of the first region 310) as the recognition device 400, and a second button which responds to the second region 320 may be provided (e.g., in the vicinity of the second region 320) as the recognition device 400. In that case, when the first button is pressed by the person M, the reproduction data P1 is output from the first region 310, and when the second button is pressed by the person M, the reproduction data P1 is output from the second region 320.

Further, there may be used, as the recognition device 400, a controller (such as a joystick) for indicating a direction. In that case, it may be selected based on the direction input to the controller by the person M that which of the first region 310 and the second region 320 the reproduction data P1 is output from.

1-2. Example of Content Output by Output Device (Part 2)

Figure 2:
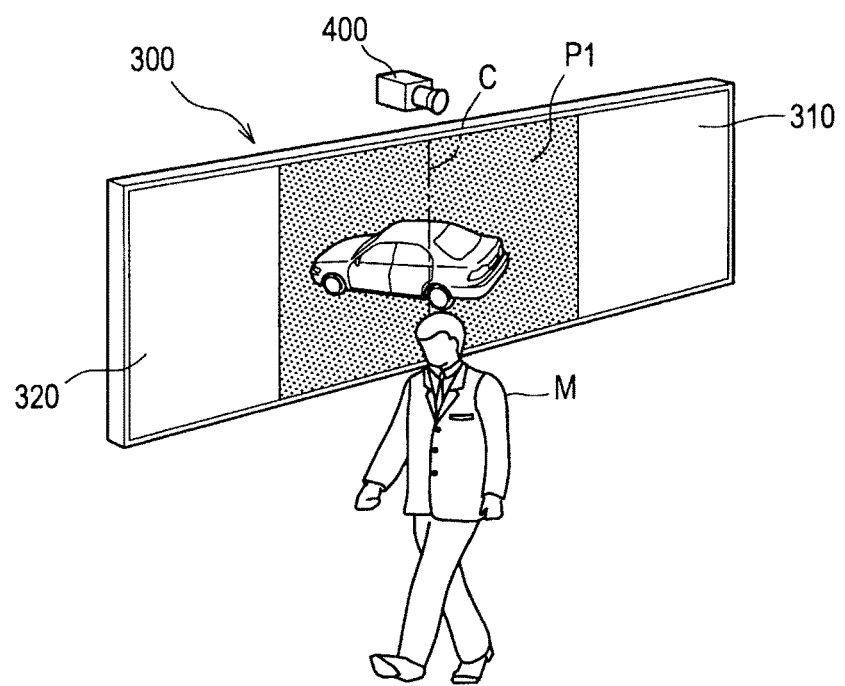
FIG. 2 is a diagram showing an example of content output by the output device according to the embodiment (part 2)

FIG. 2 is a diagram showing an example of content output by the output device according to the first embodiment of the present invention (part 2). With reference to FIG. 2, the example of content output by the output device according to the first embodiment of the present invention (part 2) will be described.

As shown in FIG. 2, it is assumed that the person M moves in front of the first region 310 to in front of the second region 320. In this case, for example, the person M is detected to be present in between the first region 310 and the second region 320. In this case, a part of the reproduction data P1 can be output from the first region 310 and the rest thereof can be output from the second region 320. Accordingly, the reproduction data P1 can be output with higher accuracy from the position close to the person M.

1-3. Example of Content Output by Output Device (Part 3)

Figure 3:
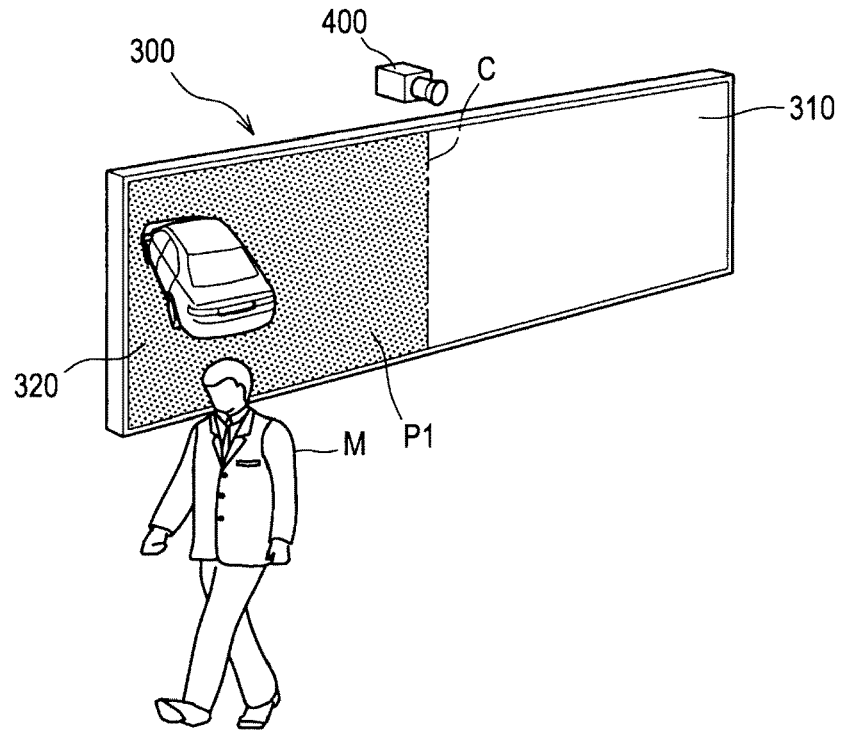
FIG. 3 is a diagram showing an example of content output by the output device according to the embodiment (part 3)

FIG. 3 is a diagram showing an example of content output by the output device according to the first embodiment of the present invention (part 3). With reference to FIG. 3, the example of content output by the output device according to the first embodiment of the present invention will be described.

As shown in FIG. 3, it is assumed that the person M moves in front of the second region 320. In this case, for example, the person M is detected to be present in front of the second region 320, and the reproduction data P1 is output from the second region 320. Accordingly, the reproduction data P1 can be output from the position close to the person M.

1-4. Example of Content Output by Output Device (Example of Content Output in Accordance with Detection Attribute)

Figure 4:
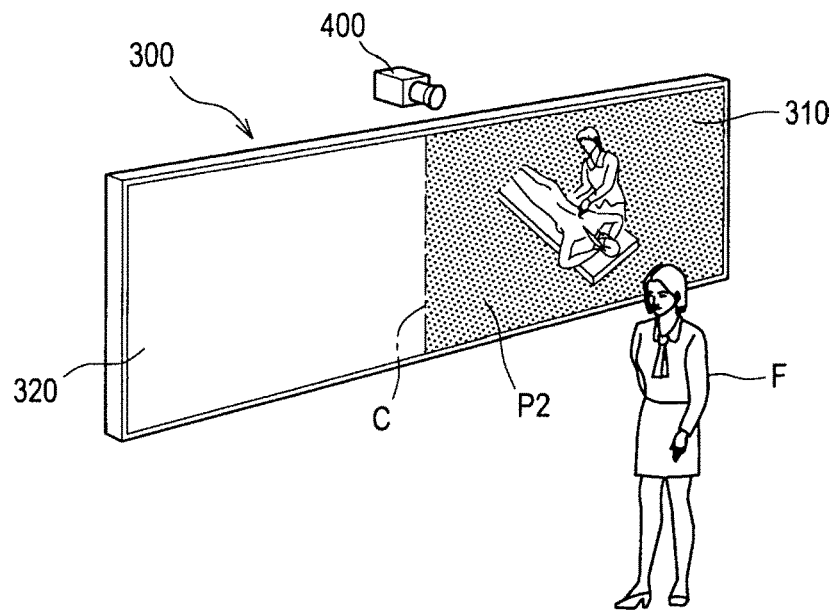
FIG. 4 is a diagram showing an example of content output by the output device according to the embodiment (example of content output in accordance with a detection attribute)

FIG. 4 is a diagram showing an example of content output by the output device according to the first embodiment of the present invention (example of content output in accordance with a detection attribute). With reference to FIG. 4, the example of content output by the output device according to the first embodiment of the present invention (example of content output in accordance with a detection attribute) will be described.

As shown in FIG. 4, it is assumed that a person F is present in front of the first region 310. In this case, for example, the person F is detected to be present in front of the first region 310. Here, the detected person F is analyzed, and reproduction data to be output from the first region 310 may be decided based on an attribute extracted as an analyzed result. For example, as shown in FIG. 4, in the case where the sex (female) is extracted as the attribute of the person F, reproduction data P2 aimed at women may be output from the first region 310. Note that the attribute of a person is not limited to the sex of the person, and may be the age and the like of the person.

1-5. Example of Content Output by Output Device (Example of Content Output in Accordance with Number of Detected People)

Figure 5:
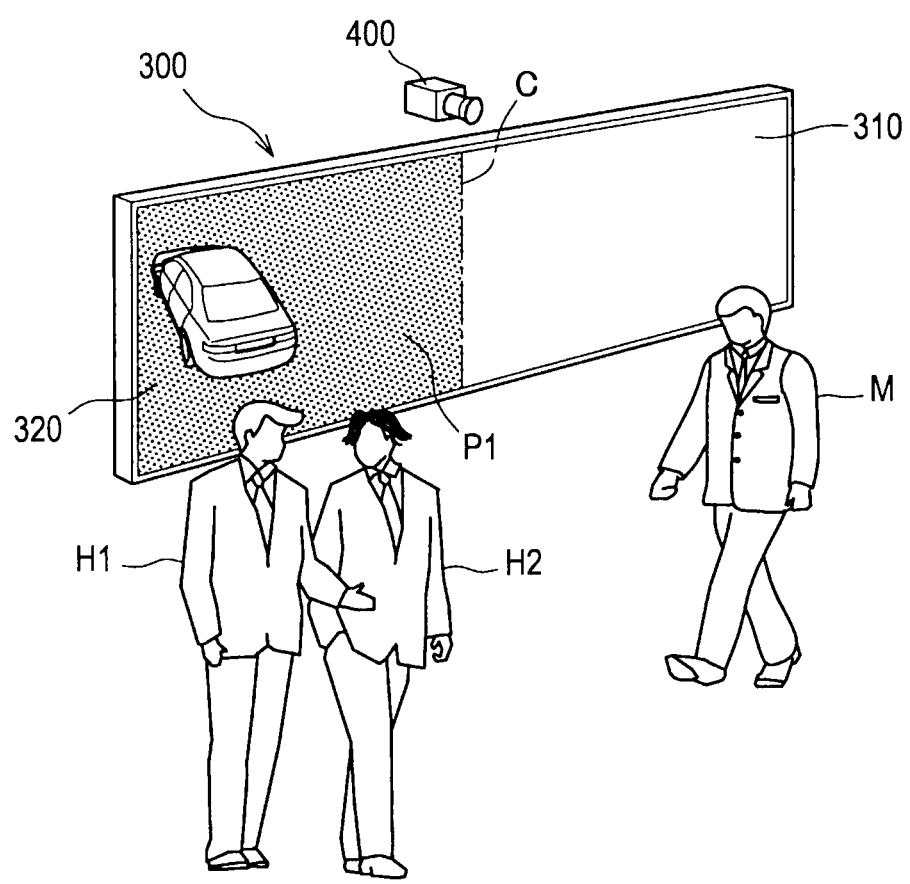
FIG. 5 is a diagram showing an example of content output by the output device according to the embodiment (example of content output in accordance with the number of detected people)

FIG. 5 is a diagram showing an example of content output by the output device according to the first embodiment of the present invention (example of content output in accordance with the number of detected people). With reference to FIG. 5, the example of content output by the output device according to the first embodiment of the present invention (example of content output in accordance with the number of detected people) will be described.

As shown in FIG. 5, it is assumed that the person M is present in front of the first region 310, and a person H1 and a person H2 are present in front of the second region 320. In this case, for example, the person M is detected to be present in front of the first region 310, and the person H1 and the person H2 are detected to be present in front of the second region 320. Here, the reproduction data P1 may be output from a position in accordance with the number of detected people. For example, as shown in FIG. 5, while there is one person (person M) in front of the first region 310, there are two persons (person H1 and person H2) in front of second region 320. Accordingly, because the number of people in front of the second region 320 is larger than the number of people in front of the first region 310, the reproduction data P1 may be output from the second region 320.

Further, reproduction data may be output from both the first region 310 and the second region 320. In this case, for example, the first region 310 may output reproduction data in accordance with an attribute of the person M, and the second region 320 may output reproduction data in accordance with an attribute of the person H1 or the person H2.

1-6. Configuration Example of Information Processing System

Figure 6:
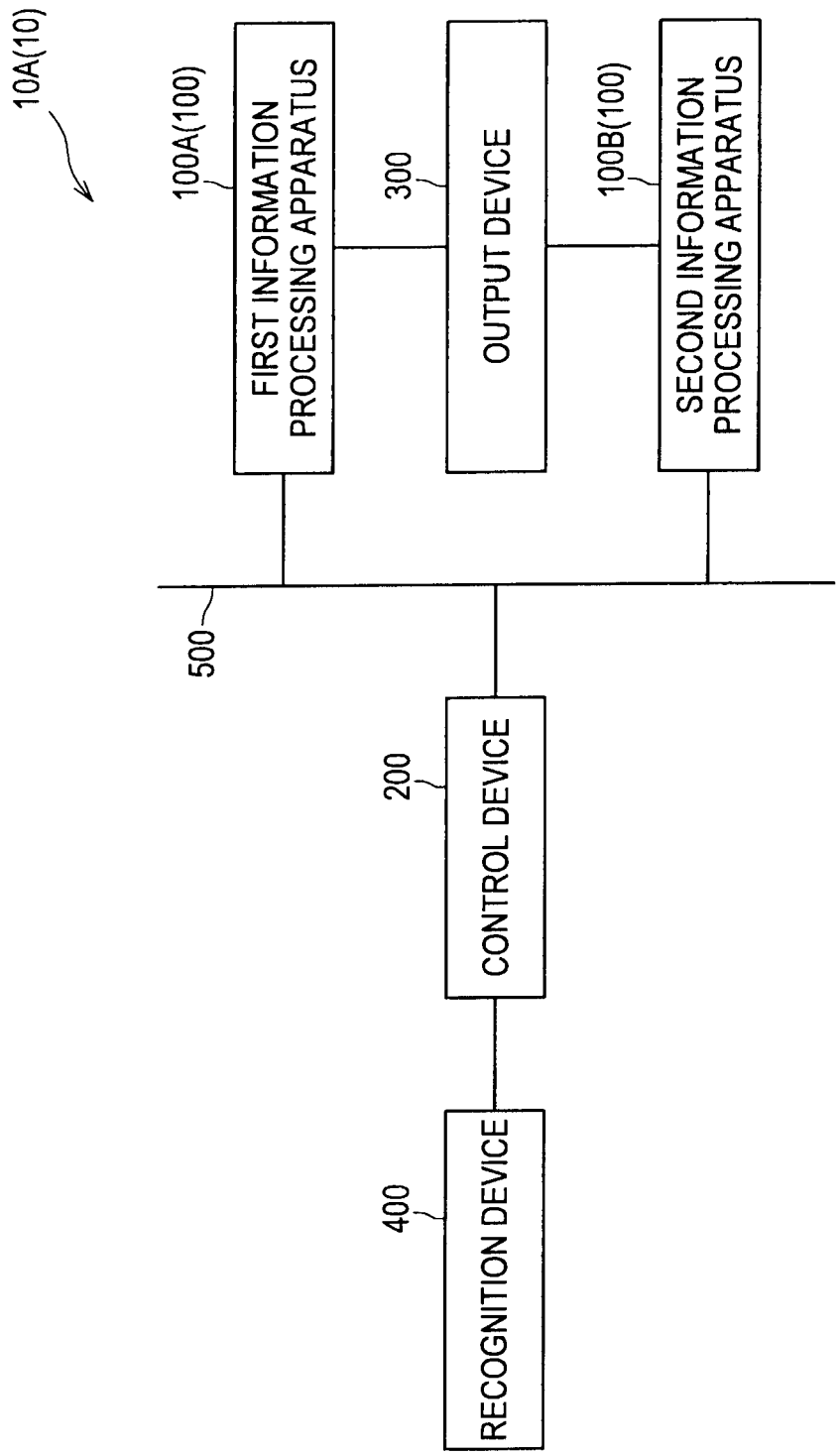
FIG. 6 is a diagram showing a configuration example of an information processing system according to the embodiment.

FIG. 6 is a diagram showing a configuration example of an information processing system according to the first embodiment of the present invention. With reference to FIG. 6, the example of the information processing system according to the first embodiment of the present invention will be described.

As shown in FIG. 6, an information processing system 10A according to the first embodiment of the present invention includes a first information processing apparatus 100A, a second information processing apparatus 100B, a control device 200, an output device 300, and a recognition device 400. Hereinafter, in the case where it is not particularly necessary to distinguish between the information processing system 10A and an information processing system 10B which is to be described later, the information processing system 10A and the information processing system 10B are each expressed as "information processing system 10". Further, in the case where it is not particularly necessary to distinguish between the first information processing apparatus 100A and the second information processing apparatus 100B, the first information processing apparatus 100A and the second information processing apparatus 100B are each expressed as "information processing apparatus 100".

Further, as shown in FIG. 6, the information processing apparatus 100 is connected to a network 500, and is also connected to the output device 300. The control device 200 is connected to the network 500. Note that, although the control device 200 is used as a separate device from the first information processing apparatus 100A or the second information processing apparatus 100B in the present embodiment, the control device 200 may also be incorporated into the first information processing apparatus 100A or may also be incorporated into the second information processing apparatus 100B.

The recognition device 400 is connected to the control device 200. Note that, although the recognition device 400 is directly connected to the control device 200 in the present embodiment, the recognition device 400 may be directly connected to a device other than the control device 200 (for example, the first information processing apparatus 100A or the second information processing apparatus 100B), and may be indirectly connected to the control device 200. Further, as described above, the number of the recognition device 400 is not particularly limited.

Figure 7:
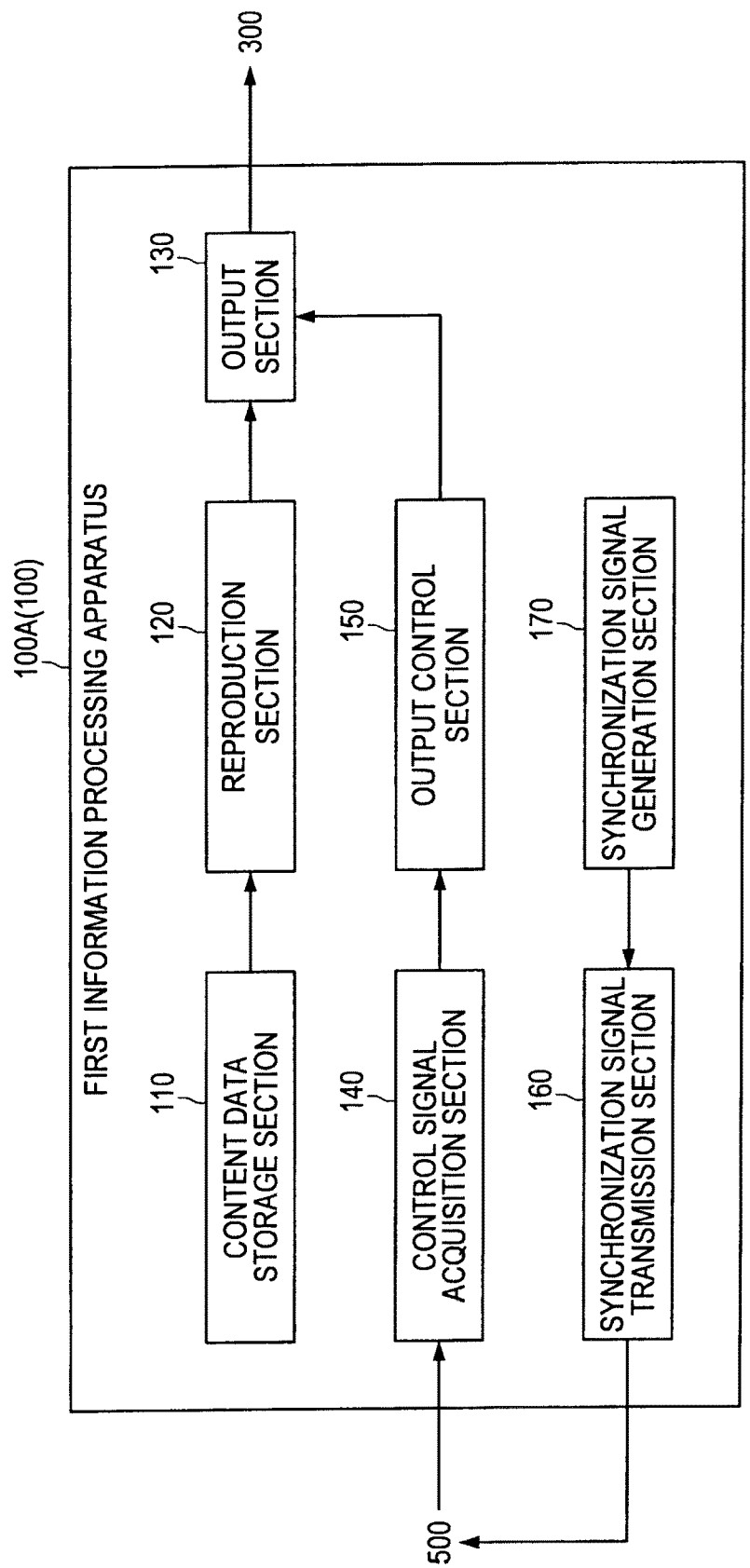
FIG. 7 is a diagram showing a functional configuration example of a first information processing apparatus according to the embodiment.

1-7. Functional Configuration Example of First Information Processing Apparatus FIG. 7 is a diagram showing a functional configuration example of a first information processing apparatus according to the first embodiment of the present invention. With reference to FIG. 7, the functional configuration example of the first information processing apparatus according to the first embodiment of the present invention will be described.

As shown in FIG. 7, the first information processing apparatus 100A includes a reproduction section 120, an output section 130, a control signal acquisition section 140, and an output control section 150, and where appropriate, includes a content data storage section 110, a synchronization signal transmission section 160, and a synchronization signal generation section 170. The synchronization signal transmission section 160 and the synchronization signal generation section 170 will be described later with reference to FIG. 10.

The content data storage section 110 has a function of storing content data. The content data storage section 110 includes an HDD (Hard Disk Drive) and a non-volatile memory, for example. Note that, in the case where the content data is retained prior to the start of reproduction of the content data, the content data storage section 110 becomes necessary, and in the case where the content data is acquired from another device via the network 500 when starting the reproduction of the content data, the content data storage section 110 may be absent. In the latter case, a content data acquisition section becomes necessary, which acquires the content data from the other device via the network 500.

The reproduction section 120 has a function of acquiring reproduction data P1 corresponding to a reproduction position of content data by reproducing the content data. As described above, the content data to be reproduced may be stored in the content data storage section 110, or may be acquired by the content data acquisition section. In the case where content identification information is included in a first control signal acquired by the control signal acquisition section 140, the reproduction section 120 reproduces content identified by the content identification information. Further, in the case where character identification information is included in the first control signal acquired by the control signal acquisition section 140, the reproduction section 120 outputs the size and color of the character identified by the character identification information to the output section 130. Content identification information and character identification information which are stored in a storage section (not shown) of the first information processing apparatus 100A can be used as the content identification information and the character identification information, for example. The reproduction section 120 includes, for example, a CPU (Central Processing Unit) and a RAM (Random Access Memory), and the function thereof can be realized by developing in the RAM a program stored in an HDD, a non-volatile memory, and the like, and executing the developed program by the CPU.

The output section 130 has a function of outputting the reproduction data P1 acquired by the reproduction section 120, from the first region 310 of the output device 300, the first region 310 corresponding to the first information processing apparatus. The output section 130 includes a predetermined connector that meets the standard which complies with the output device 300, for example.

The control signal acquisition section 140 has a function of acquiring the first control signal generated and output by the control device 200 based on a predetermined input recognized by the recognition device 400. In the example described above, the predetermined input refers to a predetermined trigger for selecting which of, at the least, the first region 310 and the second region 320 the reproduction data P1 is to be output from. The control signal acquisition section 140 includes a communication interface for performing communication via a network 500, for example.

The output control section 150 has a function of controlling output of the reproduction data P1 to the output device 300 performed by the output section 130 in accordance with the first control signal acquired by the control signal acquisition section 140. In the case where the output control section 150 determines that the first control signal includes information indicating that the reproduction data P1 is to be output, for example, the output control section 150 causes the output section 130 to output the reproduction data P1 to the first region 310 as shown in FIG. 1. Further, in the case where the output control section 150 determines that the first control signal includes information indicating that the reproduction data P1 is not to be output, for example, the output control section 150 does not cause the output section 130 to output the reproduction data P1 to the first region 310 as shown in FIG. 3. The output control section 150 includes, for example, a CPU and a RAM, and the function thereof can be realized by developing in the RAM a program stored in an HDD, a non-volatile memory, and the like, and executing the developed program by the CPU.

The control signal acquisition section 140 may acquire the first control signal including an offset calculated by the control device 200 based on the predetermined input. In that case, the output control section 150 extracts the offset from the first control signal acquired by the control signal acquisition section 140, and shifts the reproduction data P1 by a distance equivalent to the extracted offset to thereby generate shifted reproduction data. The output section 130 outputs the shifted reproduction data generated by the output control section 150 from the first region 310 of the output device 300, the first region 310 corresponding to the first information processing apparatus.

For example, in the case where the offset is "50% from the first region 310 in a direction of the second region 320", the output control section 150 shifts the reproduction data P1 in a direction from the first region 310 to the second region 320 (by 50% the width of the reproduction data P1 in the example shown in FIG. 2). When the output control section 150 outputs the shifted reproduction data from the first region 310, the shifted reproduction data (a part of the reproduction data P1) is output to the first region 310 as shown in FIG. 2.

Figure 8:
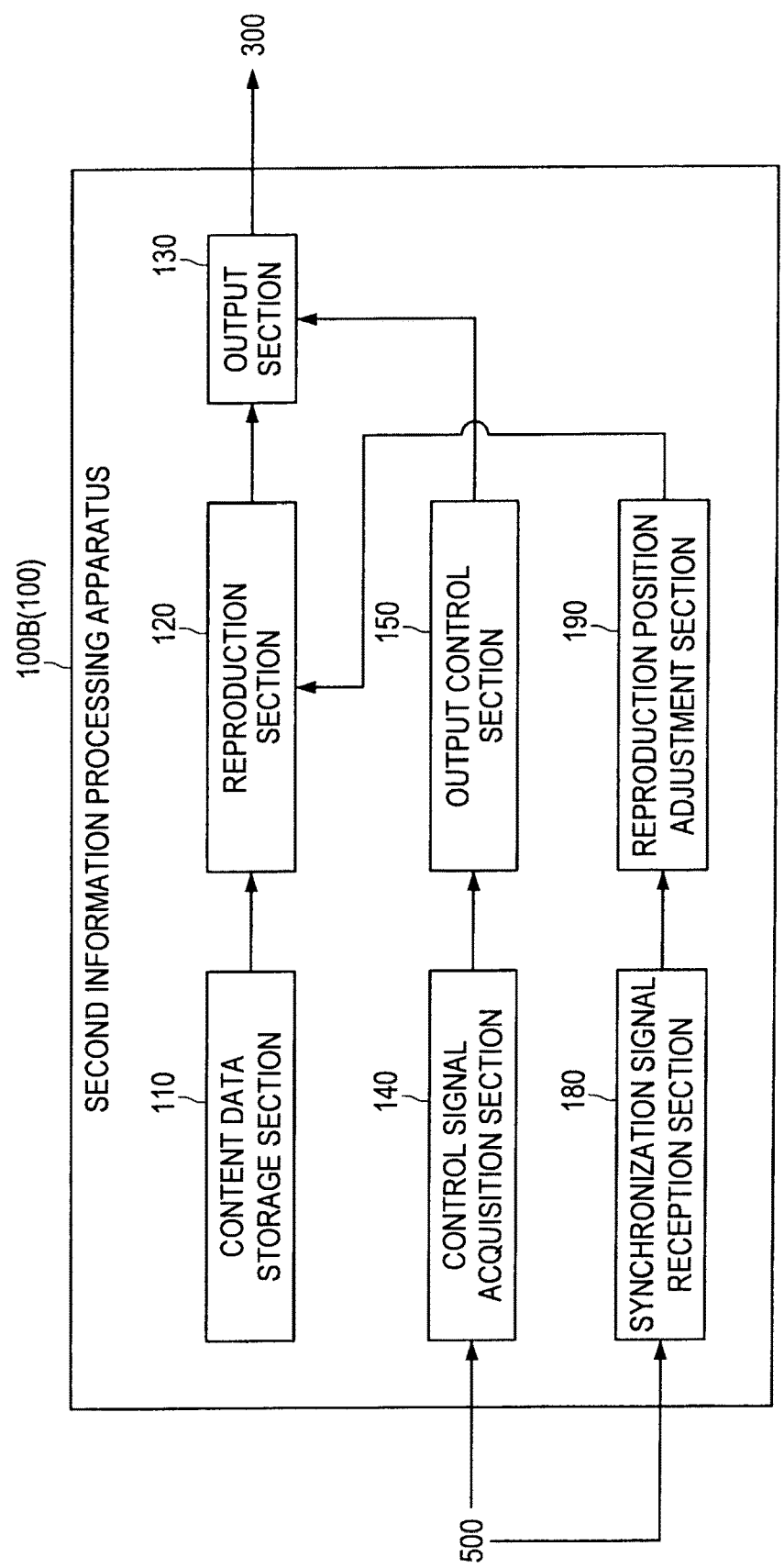
FIG. 8 is a diagram showing a functional configuration example of a second information processing apparatus according to the embodiment.

1-8. Functional Configuration Example of Second Information Processing Apparatus FIG. 8 is a diagram showing a functional configuration example of a second information processing apparatus according to the first embodiment of the present invention. With reference to FIG. 8, the functional configuration example of the second information processing apparatus according to the first embodiment of the present invention will be described.

As shown in FIG. 8, the second information processing apparatus 100B includes a reproduction section 120, an output section 130, a control signal acquisition section 140, and an output control section 150, and where appropriate, includes a content data storage section 110, a synchronization signal reception section 180, and a reproduction position adjustment section 190. The synchronization signal reception section 180 and the reproduction position adjustment section 190 will be described later with reference to FIG. 10.

The content data storage section 110 has a function of storing identical content data as the content data stored in the content data storage section 110 of the first information processing apparatus 100A. The content data storage section 110 includes an HDD and a non-volatile memory, for example. Note that, in the case where the content data is retained prior to the start of reproduction of the content data, the content data storage section 110 becomes necessary, and in the case where the content data is acquired from another device via the network 500 when starting the reproduction of the content data, the content data storage section 110 may be absent. In the latter case, a content data acquisition section becomes necessary, which acquires the content data from the other device via the network 500.

The reproduction section 120 has a function of acquiring the reproduction data P1 corresponding to a reproduction position of content data by reproducing the content data. As described above, the content data to be reproduced may be stored in the content data storage section 110, or may be acquired by the content data acquisition section. In the case where content identification information is included in a second control signal acquired by the control signal acquisition section 140, the reproduction section 120 reproduces content identified by the content identification information. Further, in the case where character identification information is included in the second control signal acquired by the control signal acquisition section 140, the reproduction section 120 outputs the size and color of the character identified by the character identification information to the output section 130. Content identification information and character identification information which are stored in a storage section (not shown) of the second information processing apparatus 100B can be used as the content identification information and the character identification information, for example. The reproduction section 120 includes, for example, a CPU and a RAM, and the function thereof can be realized by developing in the RAM a program stored in an HDD, a non-volatile memory, and the like, and executing the developed program by the CPU.

The output section 130 has a function of outputting the reproduction data P1 acquired by the reproduction section 120, from the second region 320 of the output device 300, the second region 320 corresponding to the second information processing apparatus. The output section 130 includes a predetermined connector that meets the standard which complies with the output device 300, for example.

The control signal acquisition section 140 has a function of acquiring the second control signal based on a predetermined input recognized by the recognition device 400. In the example described above, the predetermined input refers to a predetermined trigger for selecting which of, at the least, the first region 310 and the second region 320 the reproduction data P1 is to be output from. The control signal acquisition section 140 includes a communication interface for performing communication via a network 500, for example.

The output control section 150 has a function of controlling output of the reproduction data P1 to the output device 300 performed by the output section 130 in accordance with the second control signal acquired by the control signal acquisition section 140. In the case where the output control section 150 determines that the second control signal includes information indicating that the reproduction data P1 is to be output, for example, the output control section 150 causes the output section 130 to output the reproduction data P1 to the second region 320 as shown in FIG. 3. Further, in the case where the output control section 150 determines that the second control signal includes information indicating that the reproduction data P1 is not to be output, for example, the output control section 150 does not cause the output section 130 to output the reproduction data P1 to the second region 320 as shown in FIG. 1. The output control section 150 includes, for example, a CPU and a RAM, and the function thereof can be realized by developing in the RAM a program stored in an HDD, a non-volatile memory, and the like, and executing the developed program by the CPU.

The control signal acquisition section 140 may acquire the second control signal including an offset calculated by the control device 200 based on the predetermined input. In that case, the output control section 150 extracts the offset from the second control signal acquired by the control signal acquisition section 140, and shifts the reproduction data P1 by a distance equivalent to the extracted offset to thereby generate shifted reproduction data. The output section 130 outputs the shifted reproduction data generated by the output control section 150 from the second region 320 of the output device 300, the second region 320 corresponding to the second information processing apparatus.

For example, in the case where the offset is "50% from the first region 310 in a direction of the second region 320", the output control section 150 shifts the reproduction data P1 in a direction from the first region 310 to the second region 320 (by 50% the width of the reproduction data P1 in the example shown in FIG. 2). When the output control section 150 outputs the shifted reproduction data from the second region 320, the shifted reproduction data (a remaining part of the reproduction data P1) is output to the second region 320 as shown in FIG. 2.

1-9. Functional Configuration Example of Control Device

Figure 9:
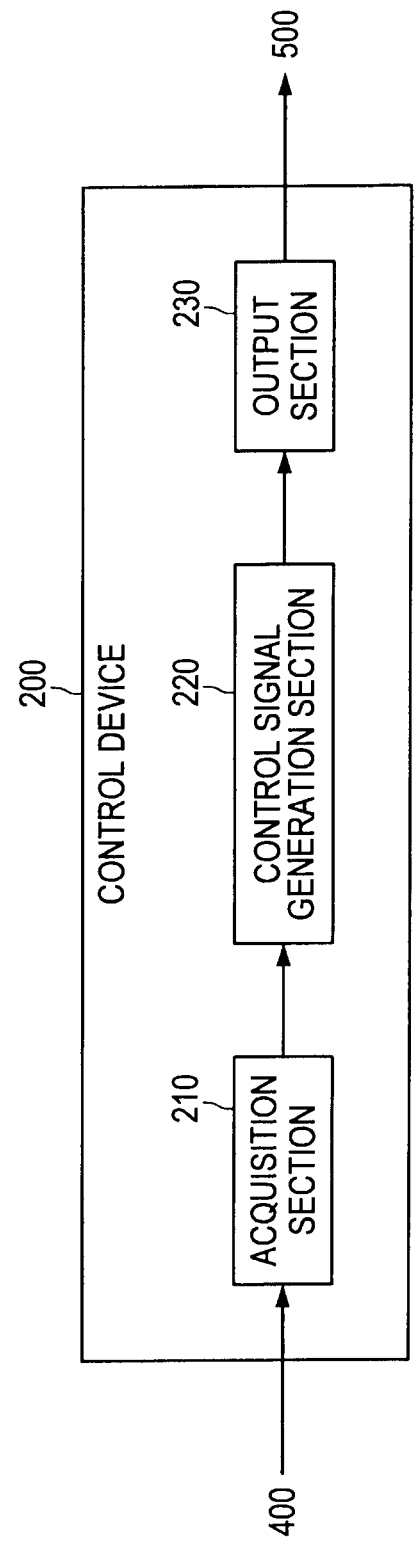
FIG. 9 is a diagram showing a functional configuration example of a control device according to the embodiment.

FIG. 9 is a diagram showing a functional configuration example of a control device according to the first embodiment of the present invention. With reference to FIG. 9, the functional configuration example of the control device according to the first embodiment of the present invention will be described.

As shown in FIG. 9, the control device 200 includes an acquisition section 210, a control signal generation section 220, and an output section 230.

The acquisition section 210 has a function of acquiring, from the recognition device 400, a predetermined input recognized by the recognition device 400. As described above, the acquisition section 210 may directly acquire the predetermined input from the recognition device 400, or may indirectly acquire the predetermined input from the recognition device 400 via the first information processing apparatus 100A, the second information processing apparatus 100B, or the like. For example, in the case of directly acquiring the predetermined input from the recognition device 400, the acquisition section 210 may include a predetermined connector that meets the standard which complies with the recognition device 400. Further, for example, in the case of indirectly acquiring the predetermined input from the recognition device 400 via the first information processing apparatus 100A, the second information processing apparatus 100B, or the like, the acquisition section 210 may include a communication interface for performing communication via a network 500.

The control signal generation section 220 has a function of generating a first control signal and a second control signal based on the predetermined input acquired by the acquisition section 210. In the example described above, the predetermined input refers to a predetermined trigger for selecting which of, at the least, the first region 310 and the second region 320 the reproduction data P1 is to be output from.

For example, the control signal generation section 220 detects the position of the face of the person M from an image acquired by the recognition device 400, and detects whether the person M is in front of the first region 310 or in front of the second region 320 in accordance with the detected face position. In the case of detecting that the person M is in front of the first region 310, for example, the control signal generation section 220 generates a first control signal including information indicating that the reproduction data P1 is to be output, and also generates a second control signal including information indicating that the reproduction data P1 is not to be output. In the case of detecting that the person M is in front of the second region 320, for example, the control signal generation section 220 generates a first control signal including information indicating that the reproduction data P1 is not to be output, and also generates a second control signal including information indicating that the reproduction data P1 is to be output. Note that it may not be necessary that the second control signal including information indicating that the reproduction data P1 is not to be output and the first control signal including information indicating that the reproduction data P1 is not to be output are generated.

Although one camera is provided as the recognition device 400 is used in the present embodiment, the recognition device 400 is not limited to the camera as described above, and the number of the recognition device 400 is not limited to one. For example, in the case where there are provided two recognition devices 400 and when the person M is detected by the recognition device 400 which responds to the first region 310, the control signal generation section 220 generates the first control signal including information indicating that the reproduction data P1 is to be output. Further, for example, when the person M is detected by the recognition device 400 which responds to the second region 320, the control signal generation section 220 generates the second control signal including information indicating that the reproduction data P1 is to be output.

The control signal generation section 220 may calculate an offset based on the predetermined input, and may generate a first control signal including the calculated offset. In the same manner, the control signal generation section 220 may calculate an offset based on the predetermined input, and may generate a second control signal including the calculated offset. The control signal generation section 220 detects the position of the face of the person M from the image acquired by the recognition device 400, and calculates the offset in accordance with the detected position of the face, for example. The control signal generation section 220 can, for example, calculate the offset to be included in the first control signal from the displacement of the position of the face based on a position of the first region 310. In the same manner, the control signal generation section 220 can, for example, calculate the offset to be included in the second control signal from the displacement of the position of the face based on a position of the second region 320. The position of the first region 310 and the position of the second region 320 may be stored in a storage section (not shown) of the control device 200, and may be the positions which are acquired by the first information processing apparatus 100A or the second information processing apparatus 100B and received by the control device 200.

For example, in the case where there is further provided a recognition device 400 which responds to between the first region 310 and the second region 320, and when the person M is detected by the recognition device 400, the control signal generation section 220 generates a first control signal including an offset "50%" from the first region 310 in a direction of the second region 320", and also generates a second control signal including an offset "50% from the second region 320 in a direction of the first region 310".

The control signal generation section 220 may detect a person based on the predetermined input acquired by the acquisition section 210, and may generate the first control signal and the second control signal based on the number of detected people. For example, in the case of determining that the number of people detected in front of the first region 310 is larger than the number of people detected in front of the second region 320, the control signal generation section 220 generates a first control signal including information indicating that the reproduction data P1 is to be output. Further, for example, in the case of determining that the number of people detected in front of the second region 320 is larger than the number of people detected in front of the first region 310, the control signal generation section 220 generates a second control signal including information indicating that the reproduction data P1 is to be output.

In the example shown in FIG. 5, the control signal generation section 220 detects that the number of people in front of the first region 310 is one and also detects that the number of people in front of the second region 320 is two. As a result, the control signal generation section 220 determines that the number of people in front of the second region 320 is larger than the number of people in front of the first region 310, and generates the second control signal including information indicating that the reproduction data P1 is to be output.

The control signal generation section 220 may detect a person based on the predetermined input acquired by the acquisition section 210, may extract an attribute of the person by analyzing the detected person, and may generate the first control signal and the second control signal based on the extracted attribute. In the example shown in FIG. 4, the control signal generation section 220 extracts as the attribute of the person in front of the first region 310 that the person is female, and generates a first control signal including content identification information for identifying content aimed at women. As information in which an attribute and the content identification information are correlated with each other, there may be used information stored in a storage section (not shown) of the control device 200, for example. Further, the control signal generation section 220 may generate a first control signal and a second control signal each including character identification information for identifying the size and color of the character, based on the extracted attribute. As information in which an attribute and the character identification information are correlated with each other, there may be used information stored in a storage section (not shown) of the control device 200.

The control signal generation section 220 may extract the size of the face of the person by analyzing the detected person, and may generate a first control signal and a second control signal based on the extracted face size. For example, the control signal generation section 220 determines that a person whose extracted face size is smaller than a threshold is located far away from the output device 300, and it is possible not to generate a first control signal and a second control signal which include information indicating that the reproduction data P1 is to be output.

The output section 230 has a function of outputting the first control signal generated by the control signal generation section 220 to the first information processing apparatus 100A and also outputting the second control signal generated by the control signal generation section 220 to the second information processing apparatus 100B.

Figure 10:
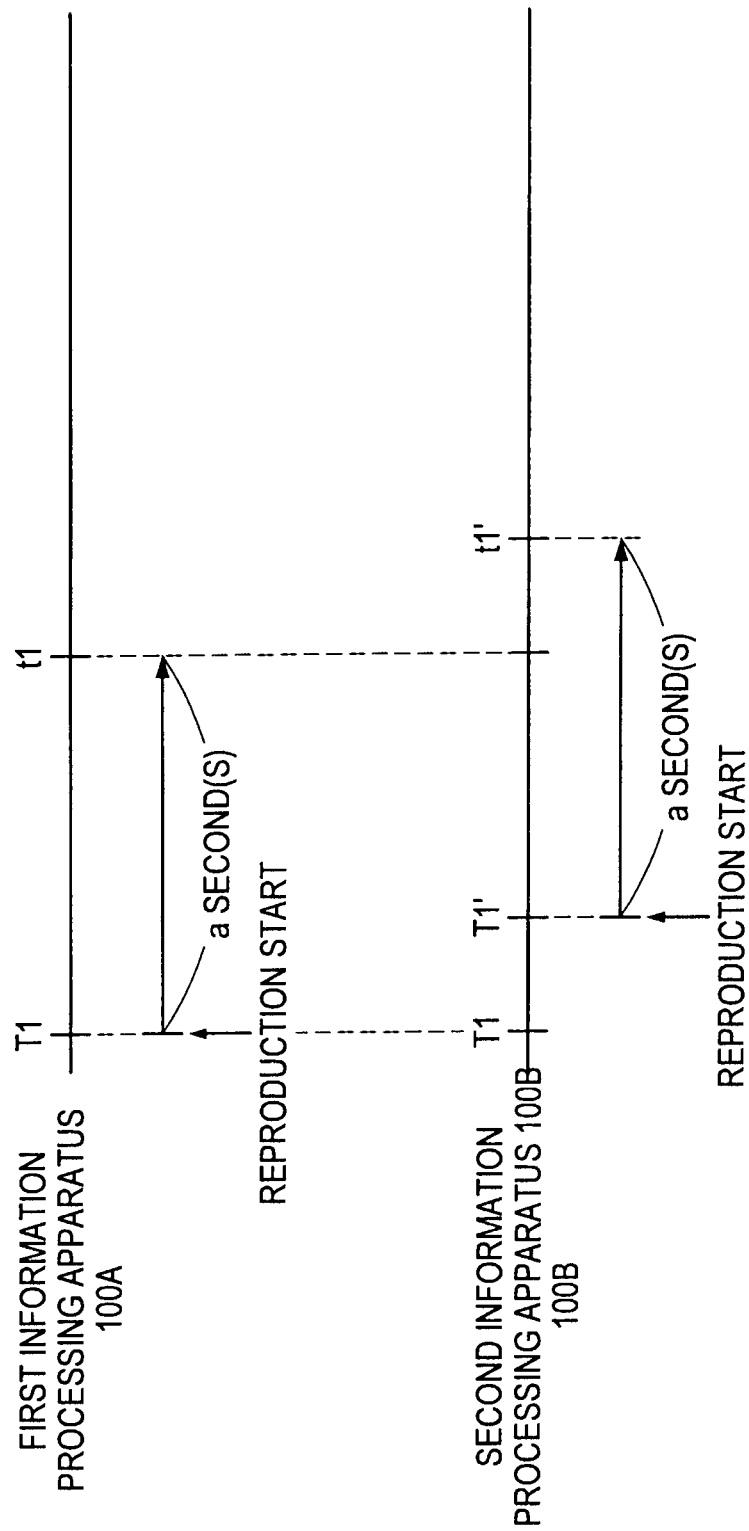
FIG. 10 is a diagram illustrating a synchronization processing between the first information processing apparatus and the second information processing apparatus according to the embodiment.

1-10. Synchronization Processing Between First Information Processing Apparatus and Second Information Processing Apparatus FIG. 10 is a diagram illustrating a synchronization processing between the first information processing apparatus and the second information processing apparatus according to the first embodiment of the present invention. With reference to FIG. 10, the synchronization processing between the first information processing apparatus and the second information processing apparatus according to the first embodiment of the present invention will be described.

The first information processing apparatus 100A and the second information processing apparatus 100B each reproduce content data by the reproduction section 120 included therein, and there is a case where it is difficult to completely match the timing at which the reproduction is started by the reproduction section 120 of the first information processing apparatus 100A to the timing at which the reproduction is started by the reproduction section 120 of the second information processing apparatus 100B. In this case, it is necessary to synchronize the first information processing apparatus 100A with the second information processing apparatus 100B.

In order to synchronize the first information processing apparatus 100A with the second information processing apparatus 100B, the synchronization signal generation section 170 of the first information processing apparatus 100A generates a synchronization signal for synchronizing the first information processing apparatus with the second information processing apparatus 100B in terms of the reproduction position of the content data. The synchronization signal transmission section 160 of the first information processing apparatus 100A transmits the synchronization signal generated by the synchronization signal generation section 170 to the second information processing apparatus 100B. The synchronization signal reception section 180 of the second information processing apparatus 100B receives the synchronization signal related to the reproduction position of the content data from the first information processing apparatus 100A. The reproduction position adjustment section 190 of the second information processing apparatus 100B adjusts the reproduction position of the content data based on the synchronization signal received by the synchronization signal reception section 180.

As shown in FIG. 10, for example, it is assumed that the first information processing apparatus 100A reproduces content data from a time T1, and that the second information processing apparatus 100B reproduces content data from a time T1'. In this case, the reproduction section 120 of the first information processing apparatus 100A further acquires reproduction position information (for example, a-second(s)) indicating the reproduction position of the content data and reproduction time information (for example, a time t1, which is a-second(s) after the reproduction of the reproduction position) indicating the time at which the reproduction position is reproduced, for example. The synchronization signal generation section 170 of the first information processing apparatus 100A generates the synchronization signal which includes the reproduction position information (for example, a-second(s)) and the reproduction time information (for example, the time t1) acquired by the reproduction section 120.

The reproduction section 120 of the second information processing apparatus 100B further acquires reproduction position information (for example, a-second(s)) indicating the reproduction position of the content data and reproduction time information (for example, the time t1') indicating the time at which the reproduction position is reproduced, for example. The synchronization signal reception section 180 receives the synchronization signal which includes the reproduction position information (for example, a-second(s)) indicating the reproduction position of the content data in the first information processing apparatus 100A and the reproduction time information (for example, the time t1) indicating the time at which the reproduction position is reproduced in the first information processing apparatus 100A. The reproduction position adjustment section 190 extracts the reproduction position information (for example, a-second(s)) and the reproduction time information (for example, the time t1) from the synchronization signal received by the synchronization signal reception section 180, and adjusts the reproduction of the content data performed by the reproduction section 120, based on the extracted reproduction position information (for example, a-second(s)) and reproduction time information (for example, the time t1), and based on the reproduction position information (for example, a-second(s)) and reproduction time information (for example, the time t1') acquired by the reproduction section 120.

In the example shown in FIG. 10, although the reproduction position information is the same for the first information processing apparatus 100A and the second information processing apparatus 100B, as for the reproduction time information, the second information processing apparatus 100B has the reproduction time information indicating the time later than the reproduction time information of the first information processing apparatus 100A. Therefore, in this case, the reproduction position adjustment section 190 performs adjustment by moving forward the reproduction position of the content data reproduced by the reproduction section 120 by an amount of time equivalent to t1'−t1 second(s).

1-11. Flow of Processing Executed by Control Device

Figure 11:
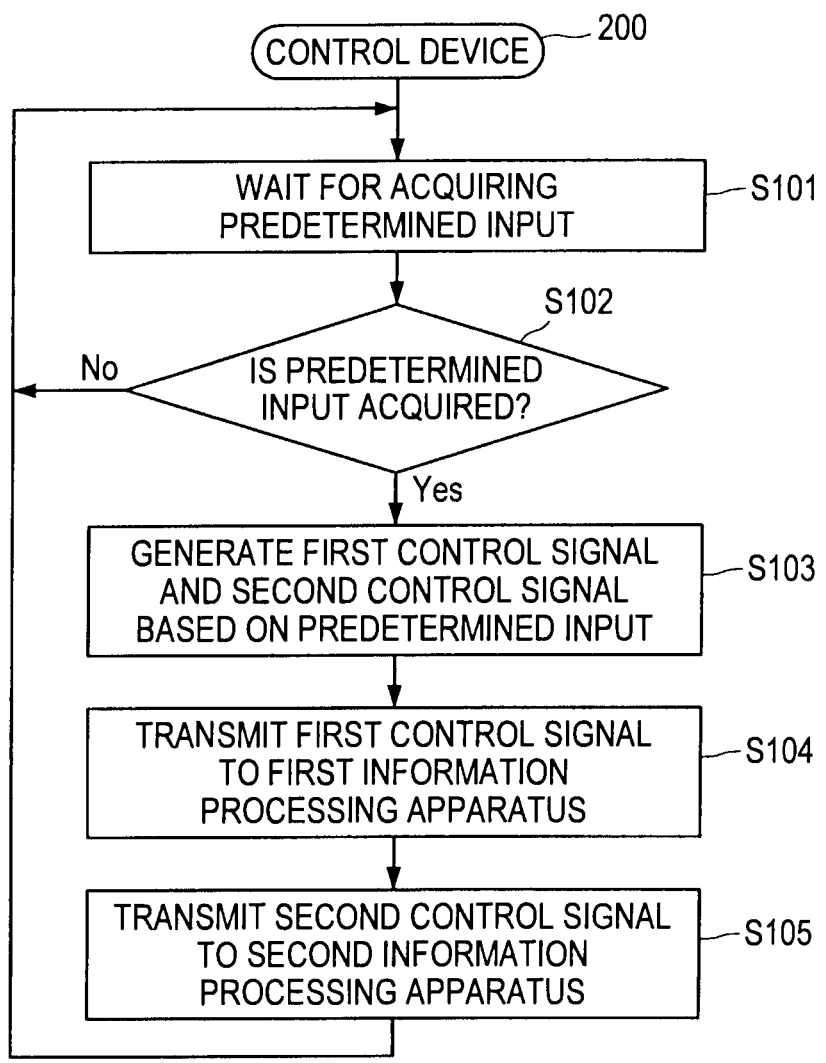
FIG. 11 is a flowchart showing a flow of processing executed by the control device according to the embodiment.

FIG. 11 is a flowchart showing a flow of processing executed by the control device according to the first embodiment of the present invention. With reference to FIG. 11, the flow of processing executed by the control device according to the first embodiment of the present invention will be described.

As shown in FIG. 11, the acquisition section 210 of the control device 200 waits until acquiring a predetermined input recognized by the recognition device 400 (Step S101). In the case where the acquisition section 210 of the control device 200 does not acquire the predetermined input ("No" in Step S102), the processing returns to Step S101. In the case where the acquisition section 210 of the control device 200 acquires the predetermined input ("Yes" in Step S102), the control signal generation section 220 of the control device 200 generates a first control signal and a second control signal based on the predetermined output (Step S103). The output section 230 of the control device 200 transmits the first control signal to the first information processing apparatus 100A (Step S104), also transmits the second control signal to the second information processing apparatus 100B (Step S105), and the processing returns to Step S101.

1-12. Flow of Processing Executed by First Information Processing Apparatus

Figure 12:
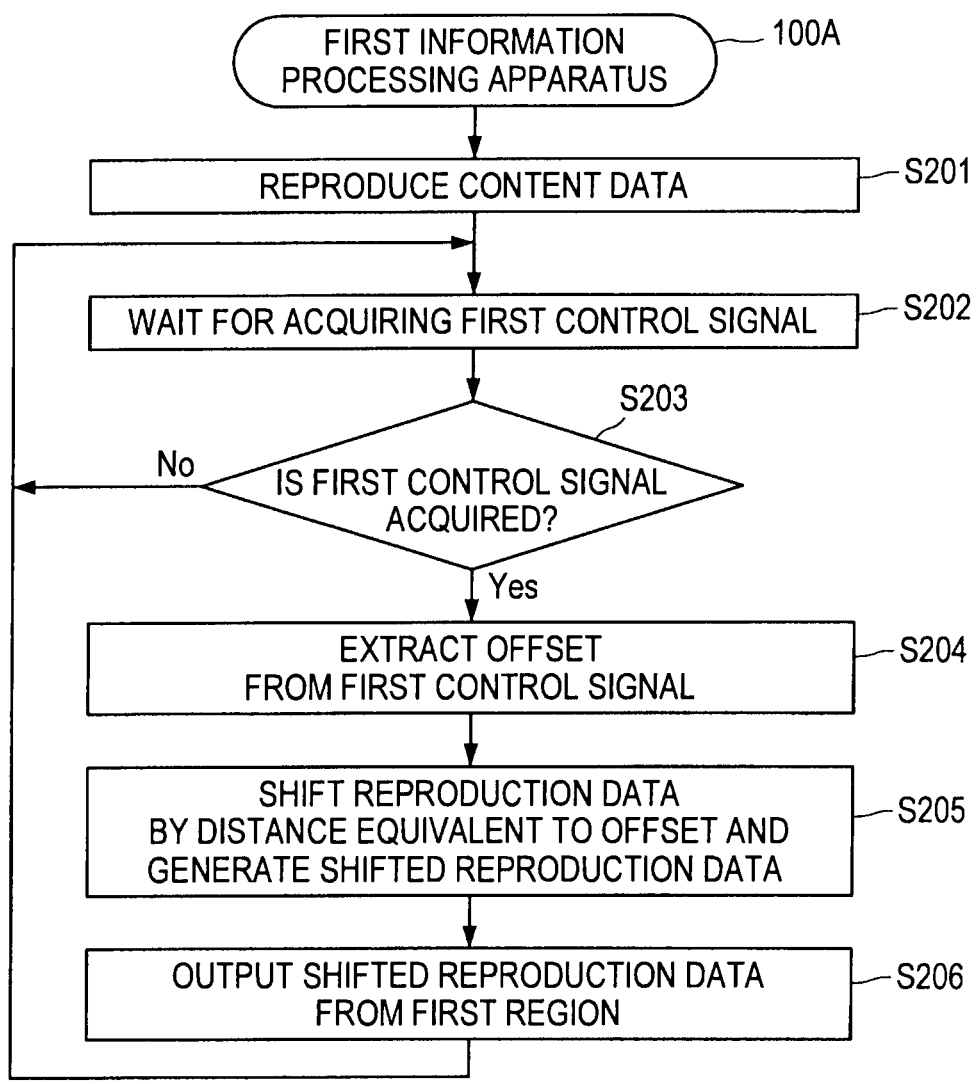
FIG. 12 is a flowchart showing a flow of processing executed by the first information processing apparatus according to the embodiment.

FIG. 12 is a flowchart showing a flow of processing executed by the first information processing apparatus according to the first embodiment of the present invention. With reference to FIG. 12, the flow of processing executed by the first information processing apparatus according to the first embodiment of the present invention will be described.

As shown in FIG. 12, the reproduction section 120 of the first information processing apparatus 100A reproduces content data (Step S201), and the control signal acquisition section 140 of the first information processing apparatus 100A waits until acquiring the first control signal output by the control device 200 (Step S202). In the case where the control signal acquisition section 140 of the first information processing apparatus 100A does not acquire the first control signal ("No" in Step S203), the processing returns to Step S202. In the case where the control signal acquisition section 140 of the first information processing apparatus 100A acquires the first control signal ("Yes" in Step S203), the output control section 150 of the first information processing apparatus 100A extracts an offset from the first control signal (Step S204). Subsequently, the output control section 150 of the first information processing apparatus 100A shifts the reproduction data P1 by a distance equivalent to the offset to thereby generate shifted reproduction data (Step S205). The output section 130 of the first information processing apparatus 100A outputs the shifted reproduction data from the first region 310 (Step S206), and the processing returns to Step S202.

1-13. Flow of Processing Executed by Second Information Processing Apparatus

Figure 13:
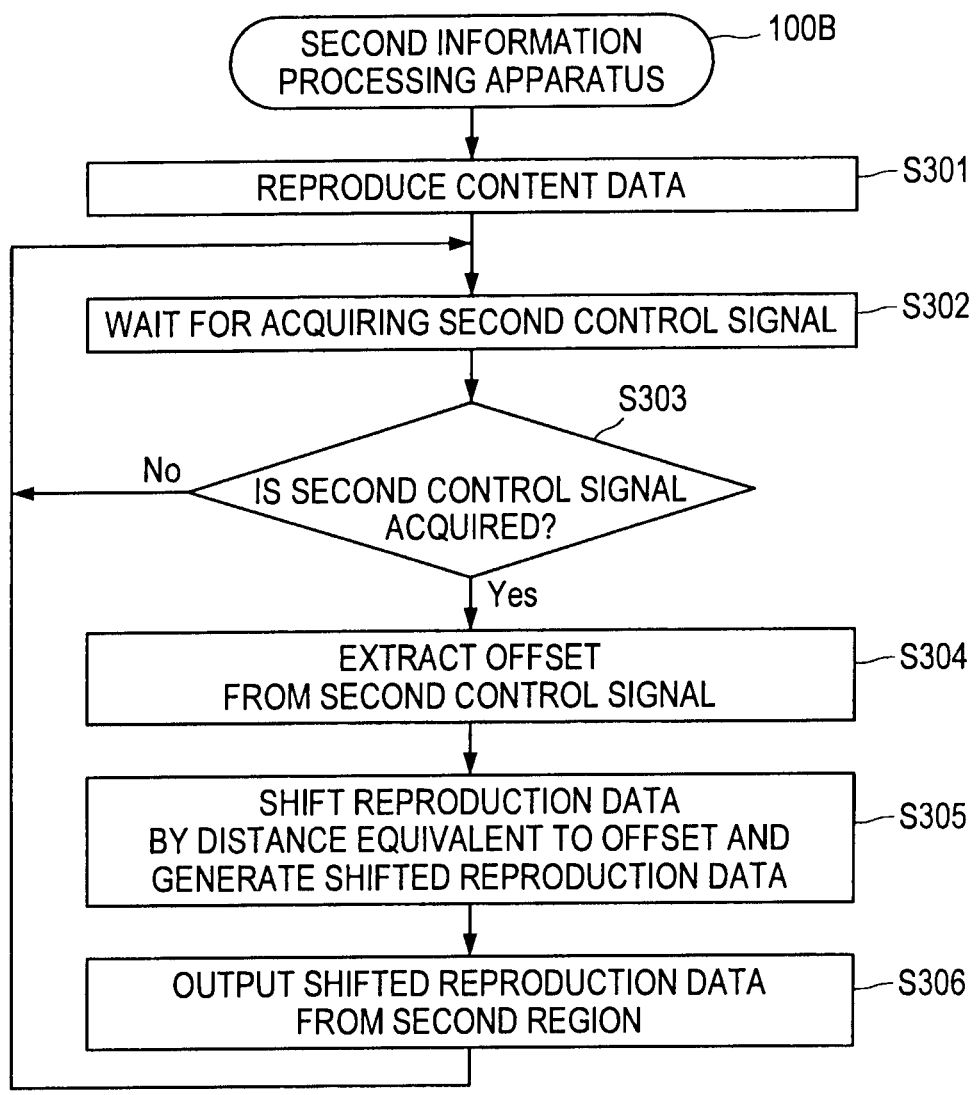
FIG. 13 is a flowchart showing a flow of processing executed by the second information processing apparatus according to the embodiment.

FIG. 13 is a flowchart showing a flow of processing executed by the second information processing apparatus according to the first embodiment of the present invention. With reference to FIG. 13, the flow of processing executed by the second information processing apparatus according to the first embodiment of the present invention will be described.

As shown in FIG. 13, the reproduction section 120 of the second information processing apparatus 100B reproduces content data (Step S301), and the control signal acquisition section 140 of the second information processing apparatus 100B waits until acquiring the second control signal output by the control device 200 (Step S302). In the case where the control signal acquisition section 140 of the second information processing apparatus 100B does not acquire the second control signal ("No" in Step S303), the processing returns to Step S302. In the case where the control signal acquisition section 140 of the second information processing apparatus 100B acquires the second control signal ("Yes" in Step S303), the output control section 150 of the second information processing apparatus 100B extracts an offset from the second control signal (Step S304). Subsequently, the output control section 150 of the second information processing apparatus 100B shifts the reproduction data P1 by a distance equivalent to the offset to thereby generate shifted reproduction data (Step S305). The output section 130 of the second information processing apparatus 100B outputs the shifted reproduction data from the second region 320 (Step S306), and the processing returns to Step S302.

2. SECOND EMBODIMENT (IN CASE OF USING MULTIPLE OUTPUT DEVICES)

2-1. Example of Content Output by Output Device (Part 1)

Figure 14:
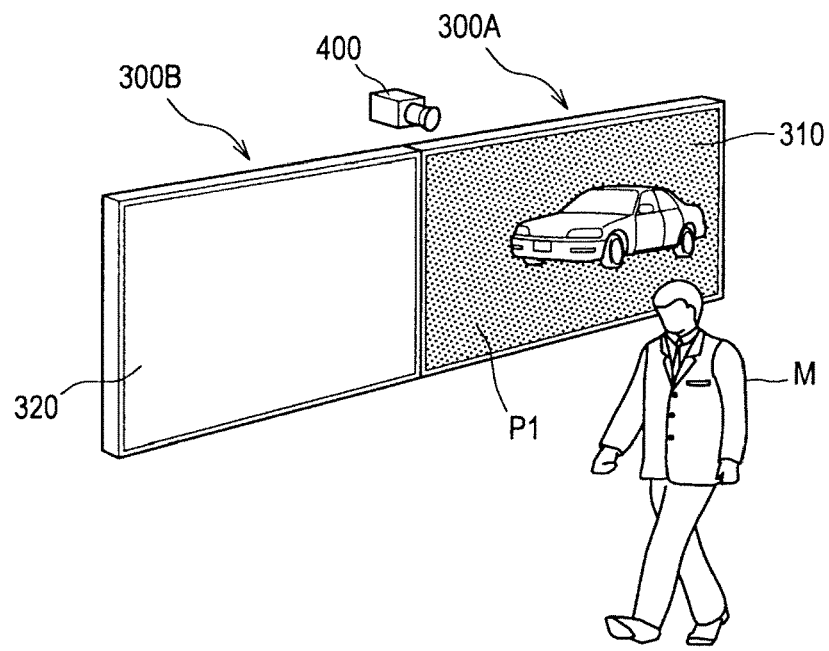
FIG. 14 is a diagram showing an example of content output by an output device according to a second embodiment of the present invention (part 1)

FIG. 14 is a diagram showing an example of content output by an output device according to a second embodiment of the present invention (part 1). With reference to FIG. 14, the example of content output by the output device according to the second embodiment of the present invention (part 1) will be described.

In the first embodiment of the present invention, the output device 300 includes the first region 310 and the second region 320 as shown in FIG. 1. However, in the second embodiment of the present invention, a first region 310 is provided to an output device 300A and a second region 320 is provided to an output device 300B, as shown in FIG. 14. Other parts included in the information processing system 10B according to the second embodiment and the information processing system 10A according to the first embodiment have the same functions with each other. Hereinafter, in the case where it is not particularly necessary to distinguish between the output device 300A and the output device 300B, the output device 300A and the output device 300B are each expressed as "output device 300". In the example shown in FIG. 14, the output device 300A outputs the reproduction data P1 from the first region 310.

2-2. Example of Content Output by Output Device (Part 2)

Figure 15:
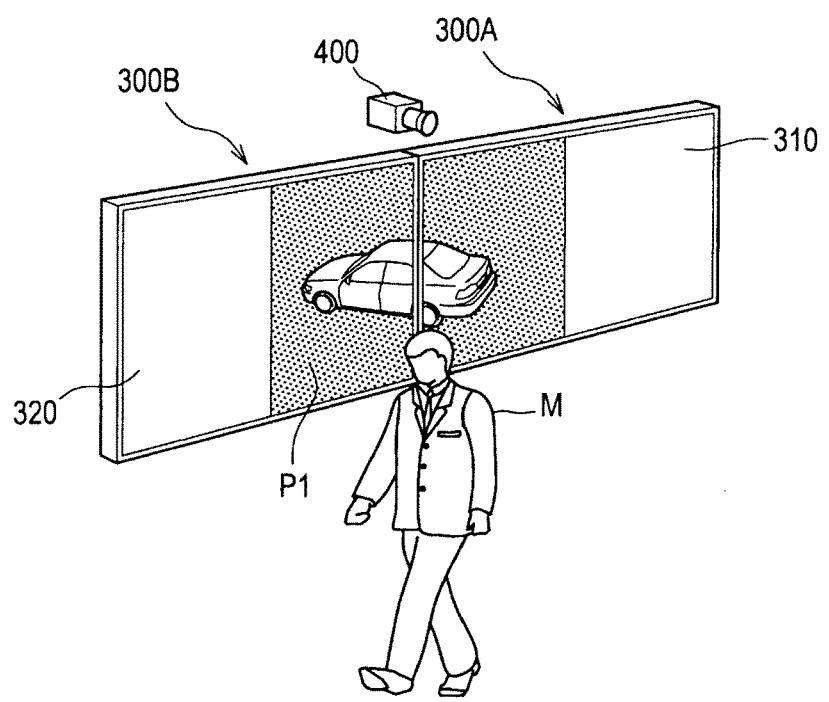
FIG. 15 is a diagram showing an example of content output by the output device according to the embodiment (part 2)

FIG. 15 is a diagram showing an example of content output by the output device according to the second embodiment of the present invention (part 2). With reference to FIG. 15, the example of content output by the output device according to the second embodiment of the present invention (part 2) will be described.

In the example shown in FIG. 15, the output device 300A outputs a part of the reproduction data P1 from the first region 310, and the output device 300B outputs the rest of the reproduction data P1 from the second region 320.

2-3. Example of Content Output by Output Device (Part 3)

Figure 16:
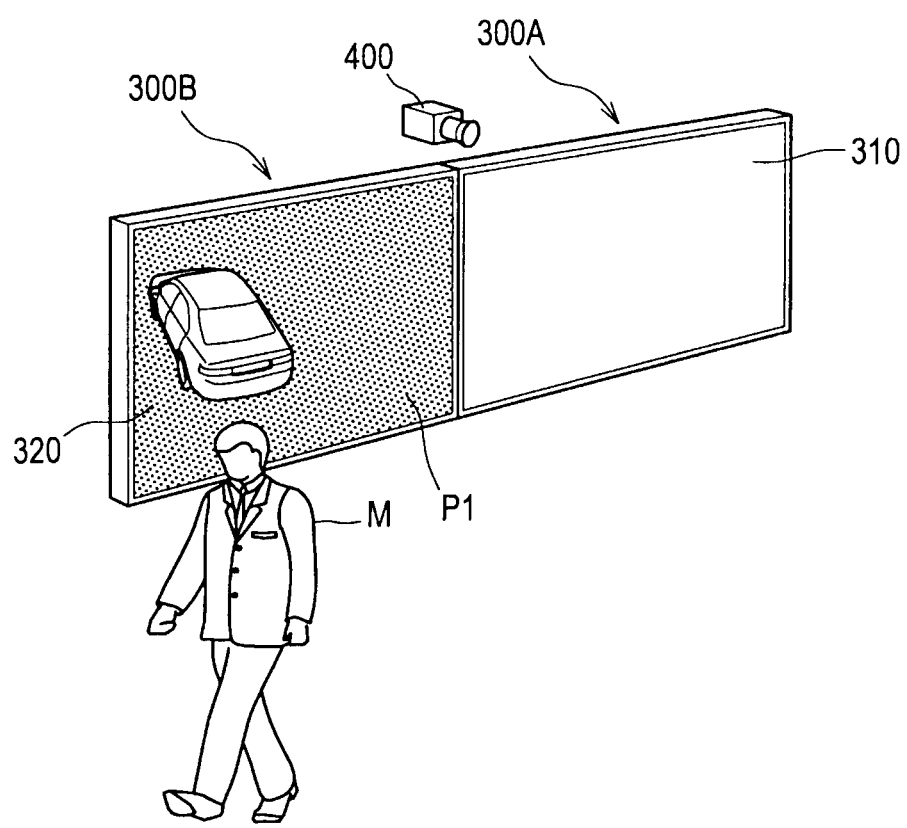
FIG. 16 is a diagram showing an example of content output by the output device according to the embodiment (part 3)

FIG. 16 is a diagram showing an example of content output by the output device according to the second embodiment of the present invention (part 3). With reference to FIG. 16, the example of content output by the output device according to the second embodiment of the present invention (part 3) will be described.

In the example shown in FIG. 16, the output device 300B outputs the reproduction data P1 from the second region 320.

2-4. Configuration Example of Information Processing System

Figure 17:
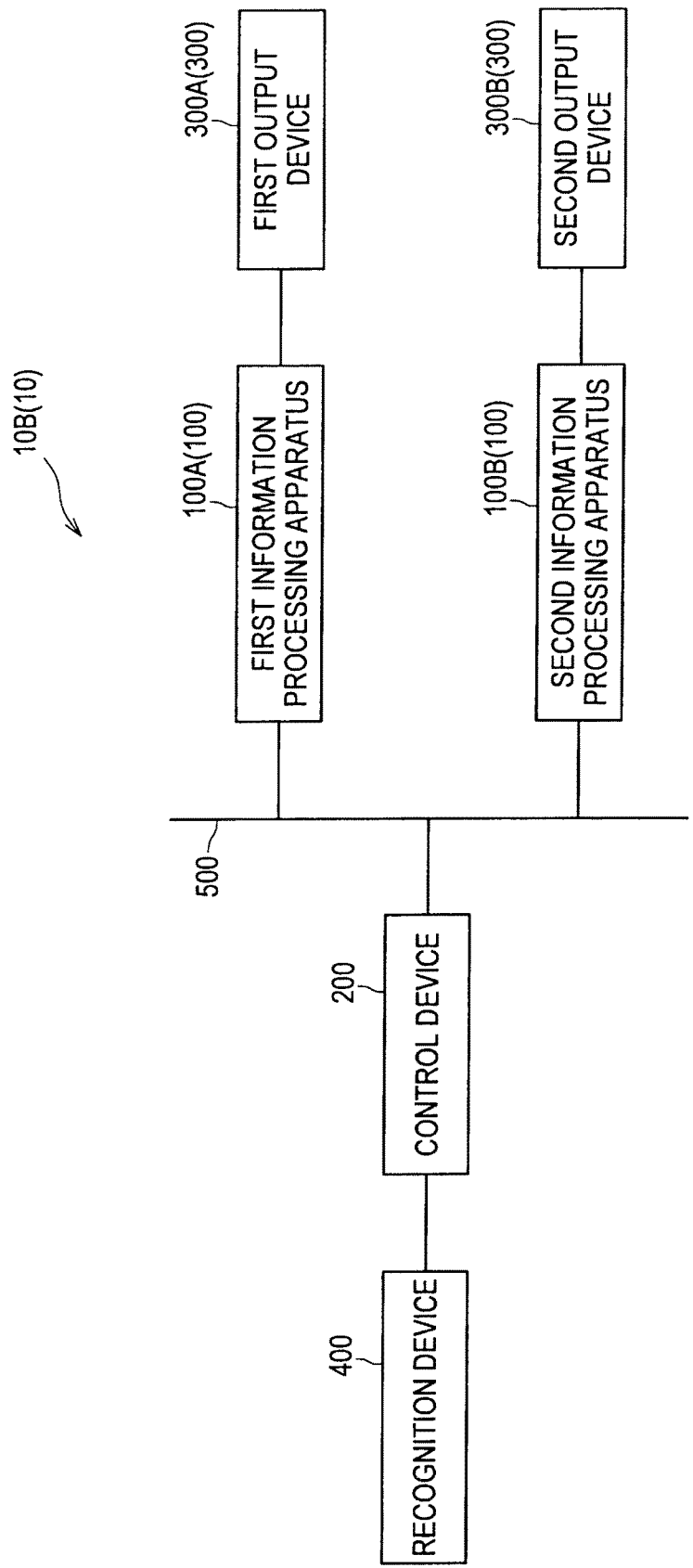
FIG. 17 is a diagram showing a configuration example of an information processing system according to the embodiment.

FIG. 17 is a diagram showing a configuration example of an information processing system according to the second embodiment of the present invention. With reference to FIG. 17, the configuration example of the information processing system according to the second embodiment of the present invention will be described.

While the information processing system 10A according to the first embodiment includes the output device 300, the information processing system 10B according to the second embodiment includes the output device 300A and the output device 300B. The output device 300A is connected to the first information processing apparatus 100A, and the output device 300B is connected to the second information processing apparatus 100B.

3. MODIFIED EXAMPLE

It should be understood by those skilled in the art that various modifications, combinations, sub-combinations and alterations may occur depending on design requirements and other factors insofar as they are within the scope of the appended claims or the equivalents thereof.

For example, although the information processing system detects a person in the above embodiments, the embodiments of the present invention are not limited thereto. For example, a target to be detected may be other than a person, and may be a vehicle, an animal, and the like.

Further, although there is described in the above embodiments the example in which the first region and the second region are provided by being arranged in the horizontal direction, the direction in which the regions are arranged is not limited to the horizontal direction and may be the vertical direction and the like. Further, as described above, the number of regions is not limited to two (the first region and the second region), and may be three or more.

4. SUMMARY

According to the present embodiments, it is possible to cause the respective regions of the output device to output the same content, and it is also possible to control the content to be output from the respective regions.

Further, the information processing system according to the present embodiments differs from an existing system in which pieces of divided content obtained by dividing one piece of content are displayed on respective display devices. That is, in the existing system, it is necessary to perform authoring to each pieces of divided content beforehand. On the other hand, in the information processing system according to the present embodiments, multiple information processing apparatuses handles identical content. Therefore, although it is necessary that the respective information processing apparatuses adjust the objects and ranges to be displayed and synchronize the timings of the display, it is possible to save the effort of performing authoring to each pieces of divided content beforehand.

The present application contains subject matter related to that disclosed in Japanese Priority Patent Application JP 2009-231352 filed in the Japan Patent Office on Oct. 5, 2009, the entire content of which is hereby incorporated by reference.

What is claimed is:

1. A first information processing apparatus, comprising:
one or more processors configured to:
reproduce content data based on a timeline;
acquire a first reproduction data that corresponds to a first reproduction position of the content data on the timeline;
acquire a control signal that is based on an input and store the acquired control signal in a memory;

control output of the first reproduction data based on the acquired control signal; and transmit a first synchronization signal that comprises a first reproduction position information and a first reproduction time information, to a second information processing apparatus, wherein the first reproduction position information indicates the first reproduction position of the content data on the timeline, and wherein the first reproduction position information corresponds to a time range on the timeline that ranges from a first time instance at which the content data is reproduced to a second time instance which is after a particular time period of the first time instance.

2. The first information processing apparatus according to claim 1, wherein the one or more processors are further configured to generate the first synchronization signal to synchronize the first information processing apparatus with the second information processing apparatus in terms of the first reproduction position of the content data.

3. The first information processing apparatus according to claim 1, wherein the one or more processors are further configured to
acquire the first reproduction position information and the first reproduction time information.

4. The first information processing apparatus according to claim 1, wherein the one or more processors are further configured to:
receive a second synchronization signal to synchronize the first information processing apparatus with the second information processing apparatus in terms of the first reproduction position of the content data; and
adjust the first reproduction position of the content data based on the received second synchronization signal.

5. The first information processing apparatus according to claim 4, wherein the one or more processors are further configured to:
acquire the first reproduction position information and the first reproduction time information;
receive the second synchronization signal which comprises a second reproduction position information that indicates a second reproduction position of the content data in the second information processing apparatus and a second reproduction time information that indicates a second time at which the content data is reproduced in the second information processing apparatus;
extract the second reproduction position information and the second reproduction time information from the received second synchronization signal; and
adjust the acquired first reproduction position of the content data based on the extracted second reproduction position information, the extracted second reproduction time information, the acquired first reproduction position information and the acquired first reproduction time information.

6. The first information processing apparatus according to claim 1, wherein
the control signal comprises an offset that is based on the input, and
the one or more processors are further configured to:
extract the offset from the acquired control signal;
shift the first reproduction data by a distance equivalent to the extracted offset to generate shifted reproduction data; and
control output of the generated shifted reproduction data.

7. The first information processing apparatus according to claim 1, wherein the one or more processors are further configured to control a size of the acquired first reproduction data based on the acquired control signal.

8. The first information processing apparatus according to claim 1, wherein the one or more processors are further configured to control a color of the acquired first reproduction data based on the acquired control signal.

9. An information processing method, comprising:
in a first information processing apparatus:
reproducing content data based on a timeline;
acquiring reproduction data, that corresponds to a reproduction position of the content data on the timeline;
acquiring a control signal that is based on an input and storing the acquired control signal in a memory;
controlling output of the reproduction data based on the acquired control signal; and
transmitting a synchronization signal that comprises reproduction position information and reproduction time information, to a second information processing apparatus,
wherein the reproduction position information indicates the reproduction position of the content data on the timeline, and
wherein the reproduction position information corresponds to a time range on the timeline that ranges from a first time instance at which the content data is reproduced to a second time instance which is after a particular time period of the first time instance.

10. An information processing system, comprising:
a first information processing apparatus; and
a second information processing apparatus,
wherein the first information processing apparatus comprises first one or more first processors configured to:
reproduce content data based on a timeline;
acquire a first reproduction data, that corresponds to a first reproduction position of the content data on the timeline;
acquire a first control signal that is based on an input and store the acquired first control signal in a memory;
control output of the first reproduction data based on the acquired first control signal; and
transmit a first synchronization signal that comprises first reproduction position information and first reproduction time information, to the second information processing apparatus,
wherein the first reproduction position information indicates the first reproduction position of the content data on the timeline, and
wherein the first reproduction position information corresponds to a time range on the timeline that ranges from a first time instance at which the content data is reproduced to a second time instance which is after a particular time period of the first time instance, and
wherein the second information processing apparatus comprises one or more second processors configured to:
adjust a second reproduction position of the content data on the timeline based on the first synchronization signal;
reproduce the content data based on the timeline;
acquire a second reproduction data that corresponds to the adjusted second reproduction position of the content data;

acquire a second control signal that is based on the input and store the acquired second control signal in a memory; and control output of the second reproduction data based on the acquired second control signal.

11. The information processing system according to claim 10, wherein the one or more first processors are further configured to generate the first synchronization signal to synchronize the first information processing apparatus with the second information processing apparatus in terms of the first reproduction position of the content data.

12. The information processing system according to claim 10, wherein the one or more second processors are further configured to:

receive the first synchronization signal to synchronize the second information processing apparatus with the first information processing apparatus in terms of the first reproduction position of the content data; and adjust the second reproduction position of the content data based on the received first synchronization signal.

13. An information processing system, comprising:

a control device;

a first information processing apparatus; and a second information processing apparatus, wherein the control device comprises first one or more first processors configured to:

acquire an input;

generate a first control signal and a second control signal based on the acquired input;

output the generated first control signal to the first information processing apparatus; and output the generated second control signal to the second information processing apparatus, wherein the first information processing apparatus comprises one or more second processors configured to:

reproduce content data based on a timeline;

acquire a first reproduction data, that corresponds to a first reproduction position of the content data on the timeline;

acquire the generated first control signal;

control output of the first reproduction data based on the acquired first control signal; and transmit a first synchronization signal that comprises first reproduction position information and first reproduction time information, to the second information processing apparatus, wherein the first reproduction position information indicates the first reproduction position of the content data on the timeline, and wherein the first reproduction position information corresponds to a time range on the timeline that ranges from a first time instance at which the content data is reproduced to a second time instance which is after a particular time period of the first time instance, and wherein the second information processing apparatus comprises third one or more third processors configured to:

receive the first synchronization signal from the first information processing apparatus;

adjust a second reproduction position of the content data on the timeline based on the received first synchronization signal;

reproduce the content data based on the timeline;

acquire a second reproduction data that corresponds to the adjusted second reproduction position of the content data;

acquire the generated second control signal and store the acquired second control signal in a memory; and control output of the second reproduction data based on the acquired second control signal.

14. The information processing system according to claim 13, wherein the one or more first processors are further configured to:

recognize a number of persons based on the input; and generate the first control signal and the second control signal based on the recognized number of persons.

15. The information processing system according to claim 13, wherein the one or more first processors are further configured to:

recognize a person based on the input;

extract an attribute of the recognized person; and generate the first control signal and the second control signal based on the extracted attribute.

16. The information processing system according to claim 13, wherein the one or more first processors are further configured to:

detect whether a person is in front of the first information processing apparatus or in front of the second information processing apparatus;

select a result of the detection as the input; and generate the first control signal and the second control signal based on the selected result of the detection.

17. The information processing system according to claim 16, wherein the detection is based on radio frequency identification (RFID).

18. The information processing system according to claim 13, wherein the one or more first processors of the control device are further configured to detect whether a person is in front of a position which is between the first information processing apparatus and the second information processing apparatus, wherein the one or more second processors of the first information processing apparatus are further configured to control output of a first part of the first reproduction data based on the detection, and wherein the one or more third processors of the second information processing apparatus are further configured to control output of a second part of the first reproduction data based on the detection.

19. A first information processing apparatus, comprising:

one or more processors configured to:

reproduce content data based on a timeline;

acquire a first reproduction data that corresponds to a first reproduction position of the content data on the timeline;

acquire a control signal that is based on an input and store the acquired control signal in a memory;

control output of the first reproduction data based on the acquired control signal;

acquire a first reproduction position information that indicates the first reproduction position of the content data, wherein the first reproduction position information corresponds to a time range on the timeline that ranges from a first time instance at which the content data is reproduced to a second time instance which is after a particular time period of the first time instance;

transmit a first synchronization signal that comprises the first reproduction position information and a first reproduction time information, to a second information processing apparatus;

receive a second synchronization signal to synchronize the first information processing apparatus with the second information processing apparatus in terms of the first reproduction position of the content data, wherein the second synchronization signal comprises a second reproduction position information that indicates a second reproduction position of the content data in the second information processing apparatus, and a second reproduction time information that indicates a second time at which the second reproduction position is reproduced in the second information processing apparatus;

extract the second reproduction position information and the second reproduction time information from the received second synchronization signal; and adjust the acquired first reproduction position of the content data based on the extracted second reproduction position information, the extracted second reproduction time information, the acquired first reproduction position information and the acquired first reproduction time information.

20. A first information processing apparatus, comprising:
one or more processors configured to:

reproduce content data based on a timeline;

acquire reproduction data that corresponds to a reproduction position of the content data on the timeline;

acquire a control signal that is based on a first position of at least one person and store the acquired control signal in a memory;

based on the acquired control signal, shift output of the reproduction data between a plurality of regions of an output device, wherein the reproduction data is output from at least a first region, that is closest to the first position of the at least one person, among the plurality of regions;

generate a synchronization signal that comprises first reproduction position information and first reproduction time information, wherein the first reproduction position information indicates the reproduction position of the content data on the timeline, and wherein the first reproduction position information corresponds to a time range on the timeline that ranges from a first time instance at which the content data is reproduced to a second time instance which is after a particular time period of the first time instance.

* * * * *